United States Patent [19]
Park

[11] 3,994,760
[45] Nov. 30, 1976

[54] APPARATUS AND IMPROVED METHOD OF BONDING A POLARIZING FILM TO AN OPTICAL SUBSTRATE WITHOUT DISTORTING THE UNIFORM DIRECTION OF POLARIZATION

[75] Inventor: Ernest David Park, Clarence, N.Y.

[73] Assignee: American Optical Corporation, Southbridge, Mass.

[22] Filed: July 11, 1975

[21] Appl. No.: 594,997

[52] U.S. Cl. .............................. 156/102; 156/104; 156/212; 156/229; 156/285; 156/475; 156/494; 264/2; 264/92
[51] Int. Cl.² ..................................... B32B 17/00
[58] Field of Search ........... 156/104, 106, 102, 285, 156/229, 212, 494, 496; 350/154, 155; 264/2, 92

[56] References Cited
UNITED STATES PATENTS

| | | | |
|---|---|---|---|
| 2,577,620 | 12/1951 | Mahler | 350/155 X |
| 3,051,054 | 8/1962 | Crandon | 156/106 X |
| 3,322,598 | 5/1967 | Marks et al. | 350/155 UX |

Primary Examiner—David A. Simmons
Attorney, Agent, or Firm—Alan H. Spencer; William C. Nealon; Howard R. Berkenstock, Jr.

[57] ABSTRACT

A stretching frame and vacuum former having an identical geometric shape with the vacuum former being proportionally reduced in peripheral dimensions, permits a stretched molecularly-oriented, light-polarizing, organic film having a uniform direction of polarization to be bonded to a substrate without distorting the direction of polarization. The method is practiced by supporting the molecularly-oriented, light-polarizing, organic film in contact with the edge of the vacuum former with the vacuum former being located substantially equidistant from the stretching frame and then a vacuum is applied to the chamber of the vacuum former to draw the film down onto the optical element. By utilizing a stretching frame and vacuum former having identical geometry, the uniform direction of polarization is not distorted by uneven stretching of the organic film as it is drawn down into contact with the glass element by the reduced pressure.

11 Claims, 5 Drawing Figures

APPARATUS AND IMPROVED METHOD OF BONDING A POLARIZING FILM TO AN OPTICAL SUBSTRATE WITHOUT DISTORTING THE UNIFORM DIRECTION OF POLARIZATION

BACKGROUND OF THE INVENTION

This invention relates to apparatus for and an improved method of adhering organic film to optical elements. More particularly, this invention relates to an improved stretching frame and vacuum former to be used in a process for applying molecularly-oriented, light-polarizing, organic films to optical elements without distorting the uniform direction of polarization in the film.

U.S. Pat. No. 3,051,054, issued Aug. 28, 1962 to Crandon, teaches improved bonding of light-polarizing organic films to glass substrates. Stretching frames and vacuum formers are shown generally; however, the intended use of the articles disclosed therein did not require extreme uniformity of the direction of polarization in the resultant bonded film. Therefore, the patent does not ascribe any criticality or suggest the need for a particular relationship between the shape and size of the vacuum former relative to the stretching frame but rather directs itself to a method of obtaining tenacious bonding between the polarizing film and the glass element.

My co-pending Application Ser. No. 594,989 filed July 11, 1975 describes a differentially-polarizing, optical element for use in a microscope in which there is an unusual degree of uniformity required in the direction of polarization after the film has been bonded to the optical element. U.S. Pat. No. 2,516,905, issued Aug. 1, 1952, Osterberg et al and U.S. Pat. No. 3,628,848, issued Dec. 21, 1971 to Nomarski, disclosed optical systems having elements that could be prepared by utilizing the apparatus and method of the the present invention.

BRIEF DESCRIPTION OF THE PRESENT INVENTION AND DRAWINGS

The utilization of a stretching frame which provides a uniform direction of polarization and a vacuum former having identical geometry and a reduced peripheral forming edge enables optical elements having a molecularly-oriented, light-polarizing, organic film to be applied thereto without distortion of the uniformity of the direction of polarization. In applying the film to the optical element, it is important that the vacuum former be positioned substantially equidistant from the sides and from the ends respectively.

DESCRIPTION OF THE PREFERRED EMBODIMENT

Figure 1:
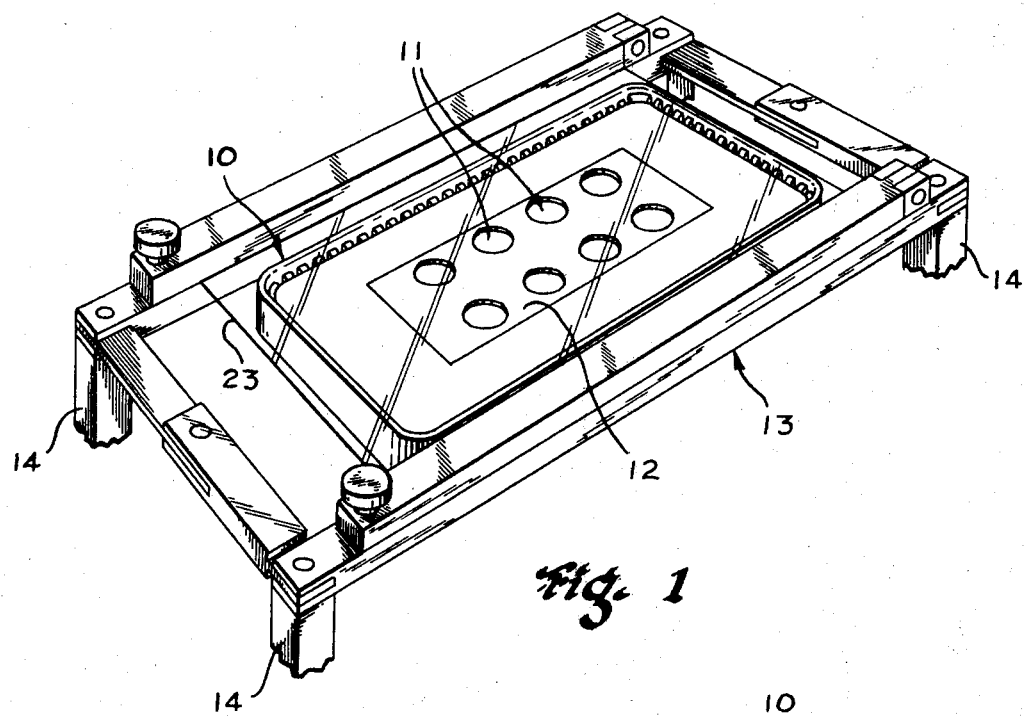
FIG. 1 is a front perspective view showing the stretching frame and vacuum former with the film ready to be applied to optical elements.

Referring to FIG. 1, a vacuum former generally indicated by 10 is shown with a group of optical elements 11 supported by carrier 12 positioned therein. A stretching frame 13 is located relative to vacuum former 10 by supports 14 which are connected to vacuum former 10.

Figure 2:
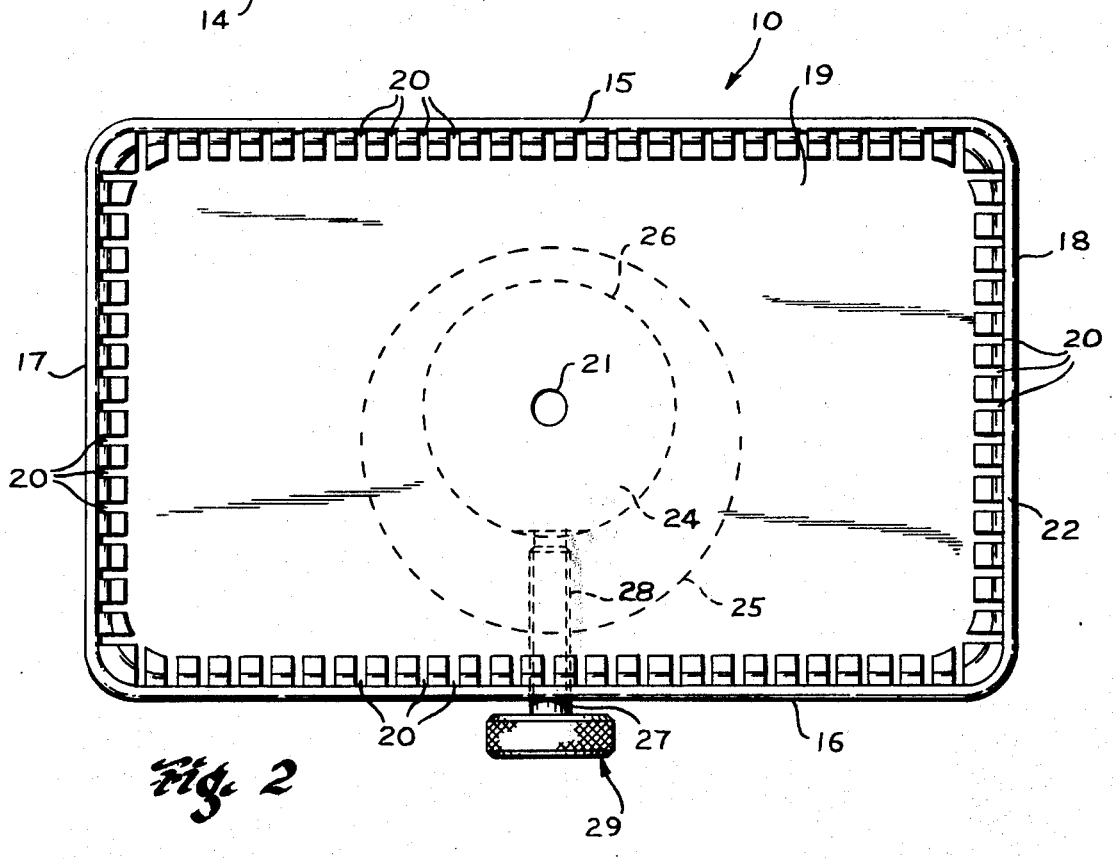
FIG. 2 is a top view of the vacuum former.

FIG. 2 is a top view of vacuum former 10, which has parallel sides 15 and 16 and parallel ends 17 and 18 to provide a generally rectangular configuration. Bottom 19 of vacuum former 10 and a portion of sides 15 and 16, as well as ends 17 and 18, have a plurality of slots 20 to provide passages for air to be withdrawn around carrier 12 by reduced pressure applied through outlet 21. Rim 22 of vacuum former 10 provides a substantially continuous smooth surface for contacting the organic film 23. Rim 22 should preferably have an edge lying in a single plane in order that a good seal is obtained without distorting the direction of polarization of organic film 23.

Figure 3:
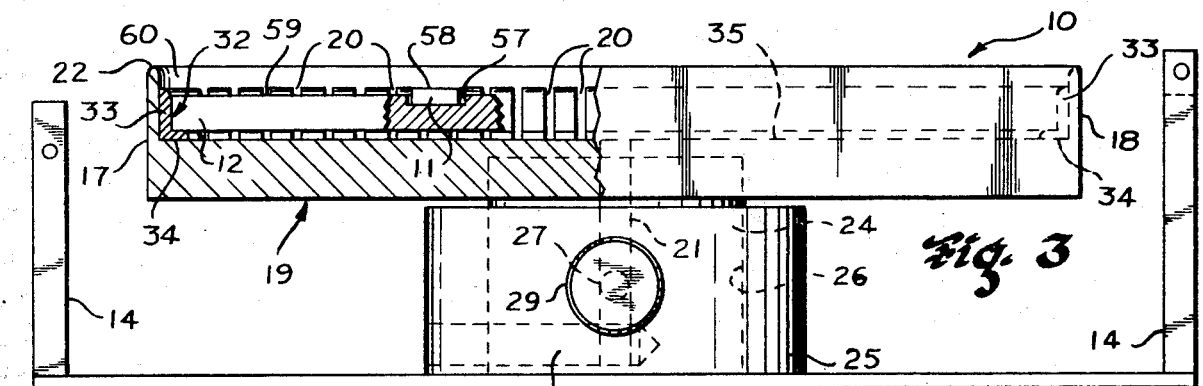
FIG. 3 is a front view of the vacuum former; and optical element holder both partly in section.

In FIG. 3, vacuum former 10 is mounted on a post 24 which is manually slidable in pillar 25 which has a bore 26 adapted to receive post 24. Lock screw 27 has external threads mating with internally threaded hole 28. Manual rotation of knob 29 allows the operator to set the position of vacuum former 10 relative to the organic film with lock screw 27. It is convenient to have pillar 25 mounted on base 30 in order that stretching frame supports 14 can also be mounted on base 30 and positioned to maintain a proper relationship between stretching frame 13 and vacuum former 10. Vertical outlet 21 is connected to horizontal passage 31 which, in turn, may be conveniently connected to a source of reduced pressure (not shown) to apply a vacuum during the coating operation.

Slots 20 in the interior sidewalls of ends 17 and 18, sides 16 and 17 and bottom 19 are cut in a raised shoulder having a vertical portion 33 and horizontal portion 34. The inwardly extending horizontal portion 34 provides a support for carrier 12 while vertical portions 33 provide a positioning reference for carrier 12 when placed in vacuum former 10. Horizontal portions 34 hold the carrier spaced from surface 35 of bottom 19 to provide a passageway for air between outlet 21 and slots 20.

Figure 4:
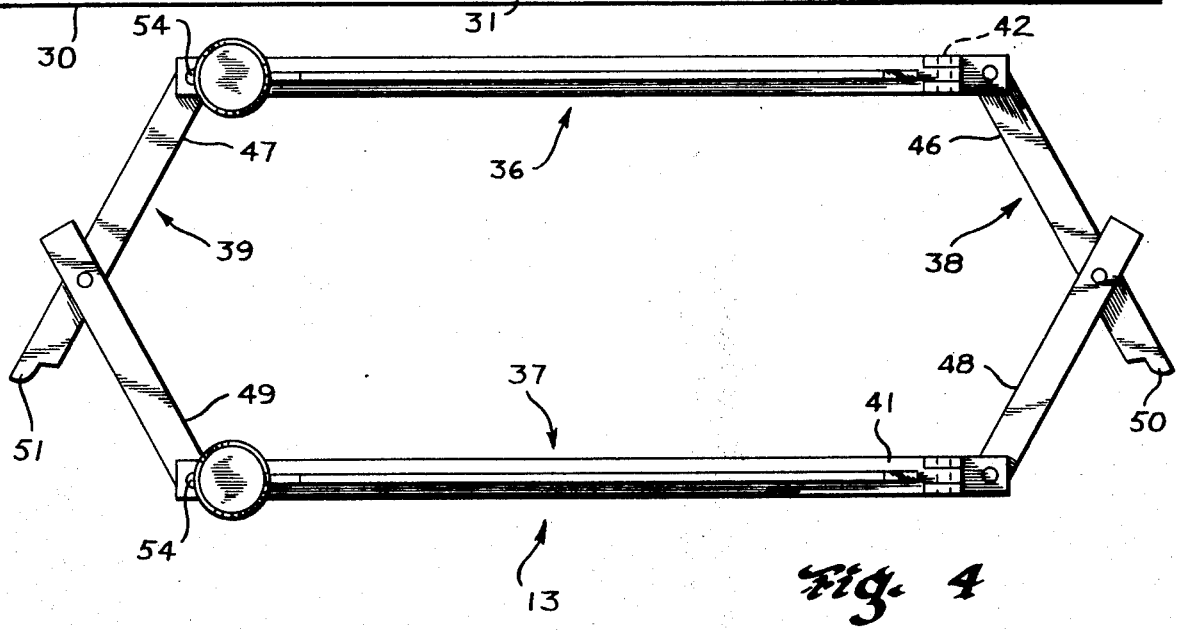
FIG. 4 is a top view of the stretching frame.
Figure 5:
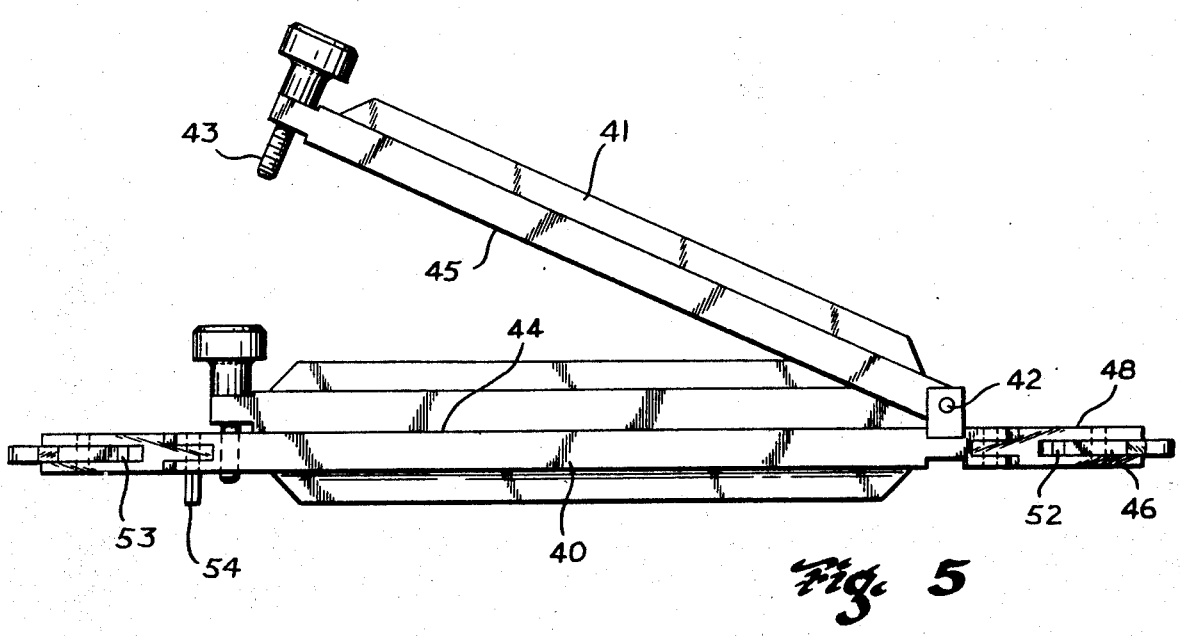
FIG. 5 is a front view of the stretching frame showing one film clamp in the open position.

Referring to FIGS. 4 and 5, a pair of longitudinal clamp members shown generally as 36 and 37 have their respective ends connected by toggles 38 and 39. Clamps 37 and 38 include stationary members 40 and swinging members 41. One end of swinging members 41 is pivotably connected by pins 42 to stationary members 40 and has clamp screws 43 at the distal end thereof in order to apply clamping pressure to the organic film by surfaces 44 and 45. After the organic film has been prepared for stretching, using procedures well known to those skilled in the art, opposed edges of the film are secured in clamps 36 and 37 and stretched by extending toggle members 38 and 39 to their straight position. Toggle members 38 and 39 each have on pivoted member 46 and 47 pivotably attached to opposite ends of clamp 36 and one pivot member 48 and 49 pivotably attached to opposite ends of clamp member 37. Pivot members 46 and 48 and 47 and 49 are linked by pins 55 and 56, respectively. Pivot members 46 and 47 each have an ear 50 and 51 respectively which abut against pins 52 and 53 respectively when extended to the straight position.

To assist positioning the stretching frame containing the stretched film in supports 14, locating pins 54 are adapted to engage recesses in the top of one pair of corresponding support members 14. It is convenient to use pins 54 as the pivot points for pivot members 47 and 49 as well as locating pins.

In practicing the method of the present invention, it is convenient to use a carrier 12, as more clearly shown, partly in section in FIG. 3 having recesses 57 into which optical elements 11 may be placed. The surface 58 of the optical elements, preferably, are positioned slightly above top 59 of carrier 12. Thus, when film 23 is in contact with rim 22 prior to applying the reduced pressure, the aggregate of optical elements are positioned substantially equidistant from the surface of said film and centrally located with respect to rim 22. Upon application of reduced pressure through horizontal passage 31, the portion of chamber 60 between film 23 and carrier 12 has the air drawn therefrom through passages 20 permitting atmospheric pressure to force the film into contact with surface 58 of optical elements 11. If desired, a border 61 of carrier 12 may be coated with a release agent as well as rim 22 to assist in separating the film therefrom after the reduced pressure has been applied to coat the optical elements. Bonding of the coating to the optical elements is conveniently obtained by the process U.S. Pat. No. 3,051,054.

As described in my co-pending application previously referred to and filed concurrently herewith, it is important that the relationship between the geometry of the film and the geometry of the chamber opening divided by the rim be identical, although the opening is obviously smaller than the film. This identity of geometry enables the film to be forced onto the element surface with predetermined stretch patterns resulting in a uniform direction of polarization.

What is claimed is:

1. Apparatus for coating a surface to obtain an optical element having an organic film coating with a uniform direction of polarization comprising the combination of:
   frame means for supporting and molecularly-orienting an organic film by stretching, said frame means providing a chosen supported film geometry of predetermined area,
   vacuum forming means for displacing the organic film supported by said frame means, said forming means having a chamber and a rim defining an opening in said chamber having a shape corresponding to said chosen supported film geometry with an area less than said predetermined area,
   means to position the optical element within said chamber,
   means to support and position said frame means with said film symmetrically disposed about said rim, one surface of said film being in contact with said rim, whereby reducing pressure in said chamber permits atmospheric pressure to force said organic film into contact with the surface of said optical element by stretching said film in a predetermined manner controlled by said chosen film geometry to provide a uniform direction of polarization in the coated surface.

2. The apparatus defined in claim 1 wherein said chosen film geometry is rectilinear and the surface of the optical element is planar.

3. The apparatus defined in claim 1 wherein said chosen film geometry is rectilinear, said rim defines a rectilinear opening and said means to position the optical element is a body having a rectilinear surface and a plurality of recesses adapted position a plurality of optical elements centrally disposed in said chamber.

4. The apparatus defined in claim 1 wherein said chamber is rectilinear, has four sidewalls and a bottom, said four sidewalls and bottom having a plurality of protrusions extending into said chamber to space said means to hold the optical element away from said four sidewalls and said bottom to provide air passages, said air passages connecting a portion of said chamber between said organic film and said optical element to a source of reduced pressure.

5. The apparatus of claim 4 wherein said means to support an optical element is a rectilinear body, said body having a plurality of recesses adapted to receive a corresponding plurality of optical elements and position the aggregate of the same symmetrically disposed to said film and centrally disposed relative to said rim.

6. The apparatus defined in claim 5 wherein said optical elements have planar surfaces to be coated.

7. The apparatus defined in claim 6 wherein said surfaces are in a plane parallel to said film and said rim and said plane is parallel and spaced from said rectilinear body.

8. The apparatus defined in claim 7 wherein said rim and the peripheral portion of said rectilinear body have a release coating thereon to prevent bonding of said film thereto.

9. In a method for applying a polarized organic film to a surface of an optical element by stretching the film to obtain polarization by molecular-orientation thereof and using a chamber having reduced pressure to apply the film to the surface of the optical element, the improvement comprising stretching said film to a chosen geometry and area, positioning the surface of the optical element symmetrically disposed on one side of said film and centrally positioned within said chosen geometry, applying a reduced pressure to the side of said film adjacent said optical element in an area having said chosen geometry.

10. The method of claim 9 wherein a plurality of optical elements are coated by centrally positioning the aggregate of said plurality within said chosen geometry.

11. The method of claim 9 wherein said plurality of optical elements have planar surfaces adjacent said film.

* * * * *